Dec. 20, 1949 J. L. FOUST 2,491,654
EXPOSURE METERS HAVING OBJECT AND
COMPARISON GRAY SCALE MEANS
Filed Sept. 6, 1946 2 Sheets-Sheet 1

INVENTOR.
John L. Foust
BY Lancaster, Allwine and Rommel
ATTORNEYS.

Dec. 20, 1949   J. L. FOUST   2,491,654
EXPOSURE METERS HAVING OBJECT AND
COMPARISON GRAY SCALE MEANS
Filed Sept. 6, 1946   2 Sheets-Sheet 2
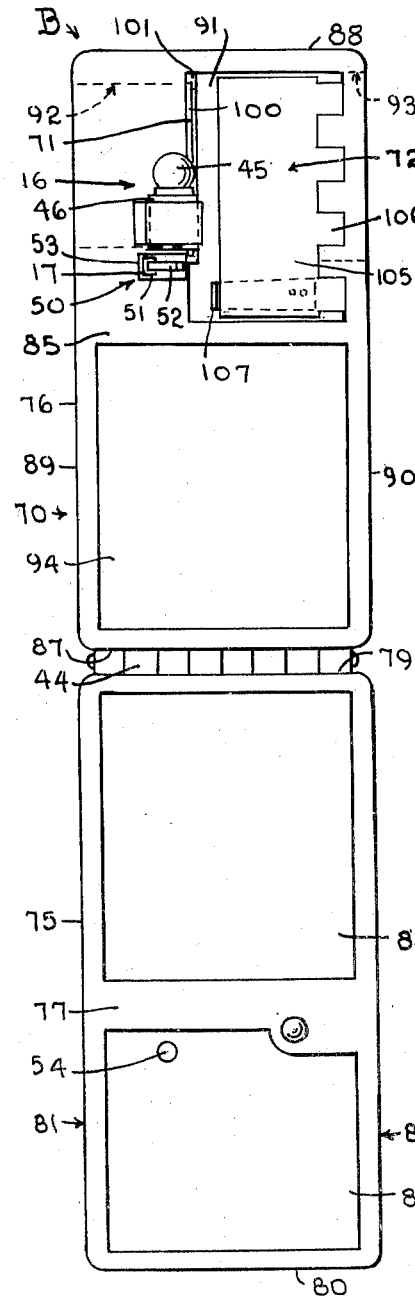
INVENTOR
John L. Foust
BY Lancaster, Allwine Rommel
ATTORNEYS.

Patented Dec. 20, 1949

2,491,654

UNITED STATES PATENT OFFICE 2,491,654

EXPOSURE METER HAVING OBJECT AND COMPARISON GRAY SCALE MEANS

John L. Foust, Madison, Wis.

Application September 6, 1946, Serial No. 695,141

5 Claims. (Cl. 88—23)

This invention relates to photographic film exposure meters, and more particularly to an indirect comparison type meter, as distinguished from direct comparison types thereof.

The meter of this invention is an indirect comparison type meter, as the reading of the object is separate from that of the comparison light. For this reason color filters are not as necessary as color filters generally employed with direct comparison types. The extinction points on the object and comparison scales employed can be compared even though the indicia of one scale may show (be illuminated by) light of a different color than the indicia of the other scale.

On the other hand, conventional comparison type meters use some form of spit comparison field (double field) where one field, illuminated by the object, is compared with a field illuminated by the comparison light. These are direct comparison meters, both fields being illuminated at the same time and the observer judging when they are of equal brightness. These meters usually use light filters so the two fields will have the same color as it is difficult to judge their comparative illumination where their colors differ. If the object field in such a meter is brilliantly illuminated by the object the comparison field must be equally brilliant.

Another advantage of the meter of this invention, which it has over the direct comparison type meters, is in its use of a comparatively low intensity comparison light. With direct comparison meters, the comparison light must be bright enough to match the field illuminated by the object. With the novel meter herein disclosed, under brilliant light conditions, nearly all the indicia on the object scale may be recognizable (showing) in which case the extinction point will be many times lower in brightness than the object itself. The comparison light has to illuminate merely an extinction point on its scale. In other words, the comparison light has to be visible only. This results, in comparison with direct comparison type meters, in longer life for the lamp and lower drain upon the battery.

Still another advantage of the meter of this invention resides in its use to scan objects which are illuminated unevenly, so as to estimate their averages illumination, and use the comparison light only once in the operation. This is done by watching the extinction point move back and forth over the object scale as readings are taken of various parts on an object. Thus, if the extinction point moved over three of the indicia of the scale such as 3, 4 and 5, the operator could recognize 4 as the extinction point and then take the comparison reading for the purpose of calculation. On the other hand, with the use of direct comparison meters, the comparison light must be used when reading each part of the object.

An important object is to provide an electric lamp and battery containing meter which is available for use as a conventional extinction type meter, in case of battery or lamp failure.

Still another object is to provide a meter in which the comparison light has a comparatively low intensity, thus increasing the life of the lamp.

Another object is to provide a meter in which the range of illumination of an object can be judged by means of the object scale alone. This results in low drain on the battery as the latter has to be energized only once instead of for each part of the object. With the ordinary comparison type meters all readings require a comparison light.

Other objects and advantages of the invention will be apparent during the course of the following detailed description, taken in connection with the accompanying drawings forming a part of this specification, and in which drawings:

Figure 6 is a plan view of another embodiment of the invention with the housing of the meter open.

Figure 7 is an elevation of one side face of the meter of Figure 6, with its housing closed.

Figure 8 is an elevation of the other side face thereof.

Figure 9 is a vertical, transverse section upon substantially the line 9—9 of Figure 8, and a light reflecting means in one position.

Figure 10 is a view, similar to Figure 9, but with the light reflecting means in another position.

In the drawings, wherein for the purpose of illustration are shown two embodiments of the invention and wherein similar reference characters designate like parts throughout the several views, the novel exposure meter of Figures 1 to 4 inclusive is designated as A and that of Figures 6 to 10, inclusive, designated as B.

Figure 1:
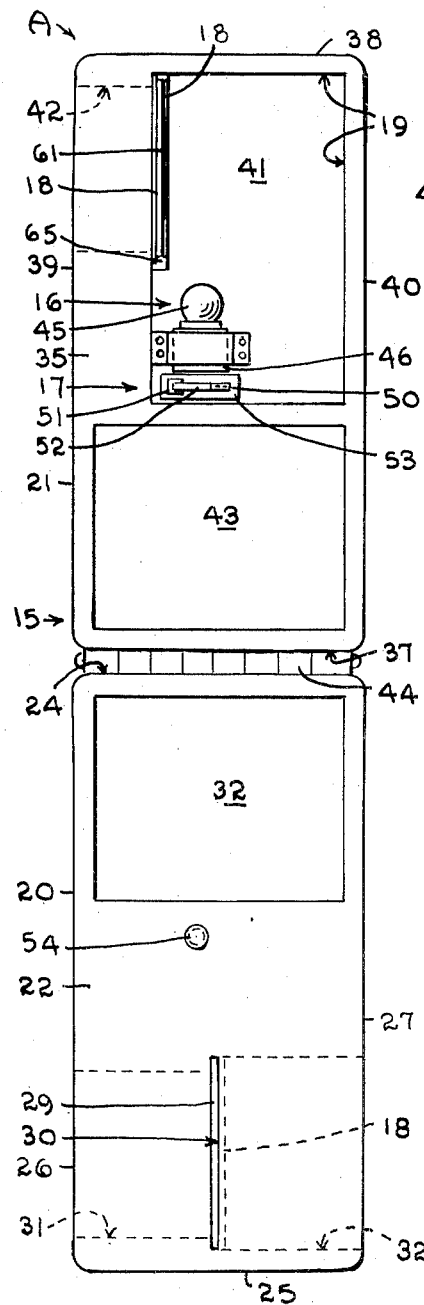
Figure 1 is a plan view of one embodiment of the novel meter, with its housing open.

The novel exposure meter A includes a housing 15; means 16 to illuminate the interior thereof; means 17 to selectively extinguish the light of the means 16 within the housing and to reilluminate the interior thereof by the means 16; extinction type scale means 18 within the housing for taking object and comparison light readings; and means 19 for directing the rays of light from the means 16 through at least a portion of the means 18.

Preferably, the housing 15 comprises two sections 20 and 21. The first section 20 of the housing 15 has a substantially flat, inner face 22, an outer face 23, parallel therewith, two outer end faces 24 and 25 in parallelism, and two outer side faces 26 and 27 in parallelism. Intermediate the side faces 26 and 27, the section 20 is provided with means 29 to retain a scale member to be subsequently described. This may be the walls of an elongated, narrow recess 30 preferably extending longitudinally of the section (and housing). Extending from the recess 30 to the face 26 is a peep slot or opening 31 and extending from the recess 30 to the face 27 is a peep slot or opening 32. For ready insertion of the scale member to be described, the recess 30 may extend from the inner face 22, preferably inclined slightly with respect to the face 22, as in Figure 4, and terminating short of the outer face 23. In addition, the section 20 may be provided with a battery-accommodating recess 32 opening into the face 22 and spaced from the recess 30 and slots 31 and 32.

As for the second section 21, this is of substantially the same size and general shape of the section 20, has a substantially flat, inner face 35, an outer face 36 parallel therewith, two outer, parallel end faces 37 and 38 and two outer, parallel side faces 39 and 40. Intermediate the faces 39 and 40 and adjacent the end face 38, is a recess 41 which extends longitudinally of the housing, accommodates a scale member to be described and may also accommodate portions of the means 16 and 17. Extending from the recess 41 to the side face 39 is a slot or peep opening 42. Preferably, the position of the slot 42 is such that, when the sections 20 and 21 are disposed as in Figure 2, the slot 31 of section 20, will be adjacent slot 42 of section 21. The section 21 may also contain a battery-accommodating recess 43 extending from the face 35 and disposed so that, when the sections 20 and 21 are disposed as in Figures 2, 3 and 4, the recesses 32 and 43 will form one recess.

If desired, the two sections 20 and 21 may be hingedly connected, as along one end of each, by a leaf hinge 44.

Figure 2:
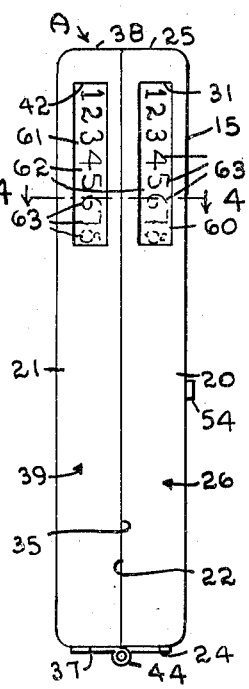
Figure 2 is an elevation of one side face of the meter, with its housing closed.
Figure 3:
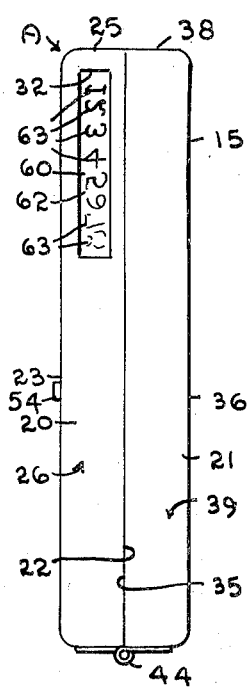
Figure 3 is an elevation of the other side face thereof.
Figure 4:
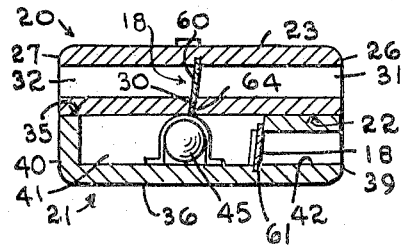
Figure 4 is a vertical, transverse section upon substantially the line 4—4 of Figure 2.

Means 16 to illuminate the interior of the housing 15 may be an electric lamp 45, set into a socket portion 46 carried by the section 21 within the recess 41, a suitable source of electricity as a battery 47 which is, preferably, a dry battery, contained in the combined recess 32 and 43, a suitable lead 48 from the battery 47 to the socket portion 46 containing the lamp 46, a suitable lead 49 from the battery 47 to a contact of the means 17 (which may be a conventional electric switch 50, having a fixed contact 51 and a movable contact 52, preferably comprising a leaf of springy metal, both secured to a suitable base 53 and contained in the recess 41) with a suitable switch button 54 extending through an opening in the section 20 and adapted to contact the movable contact 52 when the sections 20 and 21 are disposed as in Figures 2, 3 and 4, and a lead 55 from another of the contacts of the switch 50, to the socket portion 46.

The extinction type scale means or gray scale means 18 in the form A, comprises the two scale members 60 and 61. Both are indicia-bearing extinction type scale members, preferably comprising strips 62 of transparent material, such as glass, containing suitable indicia 63, as consecutive figures (a row of consecutive figures 1 to 8 inclusive is shown for example, on each scale). In the example shown, the scale member 60 provides an indicia-bearing extinction type object scale means, since it is disposed in the recess 30 and may be seen through either slot 31 or 32 but is intended to be viewed through slot 31, and the scale member 61 provides an indicia-bearing extinction type comparison scale means, since it is disposed in the recess 41 and may be seen through the slot 42. Both strips 62 are so constructed and arranged that they may be slid into their respective recesses. In the case of that portion of the recess 30 extending from the inner face 22, any suitable narrow strip 64 of opaque material may be inserted in the mouth of the recess 30, after the strip 62 of the member 60 has been inserted, to block out light rays from the lamp 45 and prevent the strip 62 from dropping out. In the case of the strip 62 of the member 61, a suitable frame 65 secured to the section 21 may be provided to frictionally grip the end edge portions of the strip 62 and prevent it from dropping down or out.

The extinction type or gray scale means used in this meter are of conventional construction and are well known in conjunction with visual extinction meters. With this type of scale some of the indicia, as the indicia 63, will be invisible under normal light conditions because of the graduated nature of the scale and the dimmest of the visible indicia 63 is herein termed the extinction point.

Means 19 for directing the rays of light from the lamp of the means 16 through at least a portion of the means 18, may be the wall surfaces of the recess 41 and that portion of the inner face 22 covering the mouth of the recess 41, which may have light-reflecting qualities imparted in any well known way such as by a coating of suitably colored paint. Light rays from the lamp 45 will be reflected from these surfaces and the said inner face portion through the adjacent extinction type comparison scale means and thence through the slot 42 to the eye of an observer peeping into the slot 42. However, as is apparent, these light rays cannot enter the slots 31 and 32, because of the inner face 22 of the section 20 which forms a wall of the recess 41 when the two sections 20 and 21 are in face-to-face contact.

Referring now to the form B, shown in Figures 6 to 10 inclusive, this invention includes a housing 70, means 16 to illuminate the interior thereof, means 17 to selectively extinguish the light of the means 16 within the housing and reilluminate the interior thereof by the means 16; extinction type scale means 71 within the housing 70 for taking object and comparison light readings; and means 72 for directing the rays of light from the means 16 through at least portions of the means 72.

The housing 70 is very much like the housing 15 and preferably comprises two sections 75 and 76.

Of the sections 75 and 76, the first section 75 corresponds with the first section 20, has a substantially flat, inner face 77, an outer face 78, parallel therewith, two outer end faces 79 and 80, in parallelism, and two outer side faces 81 and 82, also in parallelism. Extending inwardly from the inner face 77 is a first recess 83, preferably adjacent the end face 80, and, spaced from the recess 83, a battery accommodating recess 84, adjacent the end wall 79 and corresponding with the recess 32.

The second section 76 corresponds with the second section 21 of form A, is of the general shape of the section 75, and includes a flat, inner face 85, an outer face 86, parallel therewith, two end faces 87 and 88, in parallelism, and two side faces 89 and 90, in parallelism. Intermediate the faces 89 and 90 and adjacent the end face 88 is a recess 91 which extends longitudinally of the housing, accommodates a scale member to be described and may also accommodate portions of the means 16 and 17. Extending from the recess 91 to the side face 89 is a slot or peep opening 92. Extending from the recess 91 to the side face 90 is a second slot or peep opening 93 aligned with the slot 92. The section 76, like the section 21 and section 75, may contain a battery accommodating recess 94 extending from the face 85 and so disposed that, when the sections 75 and 76 are disposed as in Figures 7 to 10 inclusive, the recesses 84 and 94 form one recess. In addition, when the sections are so disposed, the recesses 83 and 91 form one recess.

If desired, the two sections 75 and 76 may be hingedly connected, as along one end of each, by a leaf hinge 44.

Figure 5:
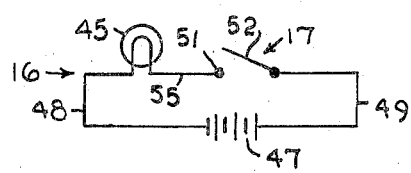
Figure 5 is a wiring diagram for the meter of Figures 1 to 4 inclusive, as well as the meter of Figures 6 to 10 inclusive.

Means 16 and 17 have been described in connection with the form A. The socket portion 46 for the electric lamp 45 as well as the switch 50, may be mounted upon the face 85 of the section 76, as in Figure 6, and extend into the recess 83 when the sections 75 and 76 are disposed as in Figures 6 to 10 inclusive. The battery 47 may be disposed within the recess formed by the combined recesses 84 and 94. The wiring diagram of Figure 5 is, of course, applicable to form B.

The extinction type scale means 71 of form B comprises a scale member 100 which provides both an extinction type object scale means and an extinction type comparison scale means. Preferably it is exactly similar to either of the scale members 60 and 61, and comprises a strip 62 of transparent material such as glass, containing suitable indicia 63, as consecutive figures (a row of consecutive figures 1 to 8 inclusive as shown, for example). This member 100 is disposed within the recess 91 and may be seen through either slot 92 or 93 but is intended to be viewed through slot 92. The strip 62 is constructed and arranged so that it may be slid into the recess 91, as a suitable frame 101 secured to the section 76 may be provided to frictionally grip the edge portions of the strip 62 and prevent its accidental dislodgement. The strip 62 covers the mouth of the slot 92.

Means 72 for directing the rays of light from the lamp of the means 17 through at least a portion of the means 71, may be a flap or movable wall 105 shown particularly in Figures 6, 9 and 10. It may be hinged, as at 106, to the wall of the recess 91 nearest the side face 90 and adjacent the inner face 85. Normally, the movable wall 105 is disposed with the plane of its under face 106' coincident with the plane of the upper faces of the slots 92 and 93, so that it does not impede the view through the slots 92 and 93. It may be retained in this position by a leaf spring 107, having one end 108 secured to the movable wall 105, near the hinge of the latter and bow downwardly to the floor of the recess 91. A suitable plunger 109 extending from the face 78 of the section 75 into the recess 91, when the two sections 75 and 76 are together, as in Figures 6 to 10 inclusive, is adapted to contact the wall 105, above the spring 107 to urge the wall downwardly as in Figure 10, when the plunger 109 is depressed from its position in Figure 9 to its position in Figure 10. Of course, when pressure is released upon the plunger 109, the wall 105 will spring up to its position in Figure 9. This movable wall 105, when in its position in Figure 10, blocks off light rays traversing the slot 93 from traversing the slot 92 but, if the lamp 45 be now lighted, rays from the lamp will be reflected from the surfaces of the recess formed by the combined recesses 83 and 91 and from the upper surface of the wall 105, through portions of the means 71, and the slot 92.

In use, the operator holds either meter about twelve inches from the eyes and reads the object with the object scale functioning the same as a conventional extinction meter. He then illuminates the scale functioning as a comparison scale and reads the comparison light (notes the extinction point) and then calculates the light value from these two readings.

With reference to the scale members described, if the comparison gray scale member is so graduated that each of the indicia, following the numeral 1, is only one half as transparent as the preceding numeral, and the comparison light has an intensity of 128 foot candles, the numeral 1 will show about the full intensity, the numeral 2 will show 64 foot candles, the numeral 3 will show 32 foot candles, the numeral 4 will show 16 foot candles and so on. What this comparison scale actually does is to show the light value at the lower limit of sensitivity of the observer's eye to the moment when he makes the reading.

The object gray scale member is graduated in the same manner but its illumination depends upon the illumination of the object. Now assuming that the observer sees the numeral 3 on the object scale as the extinction point. As this numeral 3 transmits only one fourth of the light from the object, he knows that if he can find its value he can calculate the illumination of the object as being four times as great, so he refers to the comparison light scale member. He may see the numeral 4 on the comparison scale member as the extinction point. As this numeral 4 has a set intensity of 16 foot candles it indicates that the numeral 3 on the object scale member has an intensity of 16 foot candles and so he calculates that the object has an intensity of 64 foot candles.

Different observers will get the same reading with this novel meter even though their eyes differ in sensitivity because, if their eyes are less sensitive on one scale member, they will also be less sensitive on the other. A reading of 2 on the object scale member and 3 on the comparison scale member will have the same result as 3 on the object scale member and 4 on the comparison scale member.

The word "reading" as herein used means the object, the illumination of which is to be ascertained or evaluated, through the object scale and noting the extinction point or noting the extinction point on the comparison scale when it is illuminated by the comparison light, or both.

Various changes may be made to the forms of the invention herein shown and described without departing from the spirit of the invention or the scope of the claims.

What is claimed is:

1. In an extinction type exposure meter, a housing, calibrated gray scale means mounted in said housing in stationary position, said housing comprising a frame defining an aperture affording visual access to the whole of one side of said scale means, a port in said housing for receiving light from the source to be measured, means establishing a light passageway from said port to a whole range of values on the other side of said scale means, a source of light of fixed intensity within said housing, means establishing a light path from said source to a whole range of values on said other side of said scale means and a partition for separating the light which passes to said other side of said scale means from said fixed intensity light source from that which passes to said other side of said scale means from said light receiving port.

2. In an extinction type exposure meter, a housing, a first calibrated gray scale mounted therein in stationary position, a light port for receiving light from the source to be measured, means establishing a light path from said port to the whole of one side of said first gray scale, said housing comprising a frame defining an aperture affording visual access to the whole of the other side of said first gray scale, a source of light of fixed intensity, a second gray scale and means establishing a light path between said source of light of fixed intensity and the whole of one side of said second scale, said housing also comprising a second frame defining an aperture affording visual access to the whole of the other side of said second scale.

3. In an extinction type exposure meter, a housing, a gray scale mounted in fixed position in said housing, said housing comprising a frame defining an aperture affording visual access to the whole of one side of said gray scale, a port in said housing for receiving light from a source to be measured, a light source of fixed intensity, means establishing a passageway from said port and said source to the whole of the other side of said gray scale and a light valve in said passageway movable from a first position blocking only the light path from said port to said other side of said gray scale to a second position blocking only the light path from said fixed intensity source to said other side of said gray scale.

4. In an extinction type exposure meter, a housing comprised of two parts marginally articulated, a first calibrated gray scale mounted in stationary position in the first of said parts, a light port in said first part for receiving light from the source to be measured, said first part defining a light path from said port to the whole of one side of said gray scale and comprising a frame defining an aperture affording visual access to the whole of the other side of said gray scale, a source of light of fixed intensity in the second part of said housing, a second gray scale in the second part of said housing, said first and second parts of said housing together establishing a light path between said source of light of fixed intensity and the whole of one side of said second scale, said second part comprising a second frame defining an aperture affording visual access to the whole of the other side of said second scale, and a battery for energizing said light source, said two parts together defining a socket for the accommodation of said battery.

5. In an extinction type exposure meter as claimed in claim 3, a spring normally resiliently biasing said light valve to said second position and an operating rod for moving said light valve to said first position against the bias of said resilient means.

JOHN L. FOUST.

REFERENCES CITED

The following references are of record in the file of this patent:

UNITED STATES PATENTS

| Number | Name | Date |
|---|---|---|
| 1,385,940 | Ellicott | July 26, 1921 |
| 1,437,399 | Comstock | Dec. 5, 1922 |
| 1,460,055 | Drew | June 26, 1923 |
| 1,918,206 | Ermisch | July 11, 1933 |
| 2,066,605 | Billings | Jan. 5, 1937 |

FOREIGN PATENTS

| Number | Country | Date |
|---|---|---|
| 132,246 | Austria | Mar. 10, 1933 |
| 137,768 | Austria | May 25, 1934 |